United States Patent [19]

Hutcherson

[11] 3,903,633
[45] Sept. 9, 1975

[54] FISHING ROD HOLDER AND SIGNAL
[76] Inventor: Robert Hutcherson, 3141 Scarlet Oak Ave., Las Vegas, Nev. 89104
[22] Filed: June 26, 1974
[21] Appl. No.: 483,120

[52] U.S. Cl. .................................. 43/17; 43/21.2
[51] Int. Cl.² .................. A01K 97/10; A01K 97/12
[58] Field of Search .................. 43/17, 21.2, 15, 16; 248/156

[56] References Cited
UNITED STATES PATENTS

| | | | |
|---|---|---|---|
| 1,175,352 | 3/1916 | Hand | 248/156 |
| 1,577,612 | 3/1926 | Dees | 43/21.2 |
| 2,771,703 | 11/1956 | Jones | 43/17 |
| 2,909,215 | 10/1959 | Mitchell | 43/21.2 |
| 3,010,239 | 11/1961 | Johnson | 43/17 |
| 3,012,354 | 12/1961 | Hansen | 43/17 |

Primary Examiner—Warner H. Camp
Attorney, Agent, or Firm—Edward J. Quirk

[57] ABSTRACT

A tubular fishing rod holder with a bite signal can be secured in the ground with a removable stake or can be fixed to a boat or pier with a clamp which is adjustable to any angle or position. The stake may be stored inside the tube when not in use, and the boat clamp folds into a compact unit, thus allowing the whole assembly to easily fit into a tackle box.

2 Claims, 2 Drawing Figures

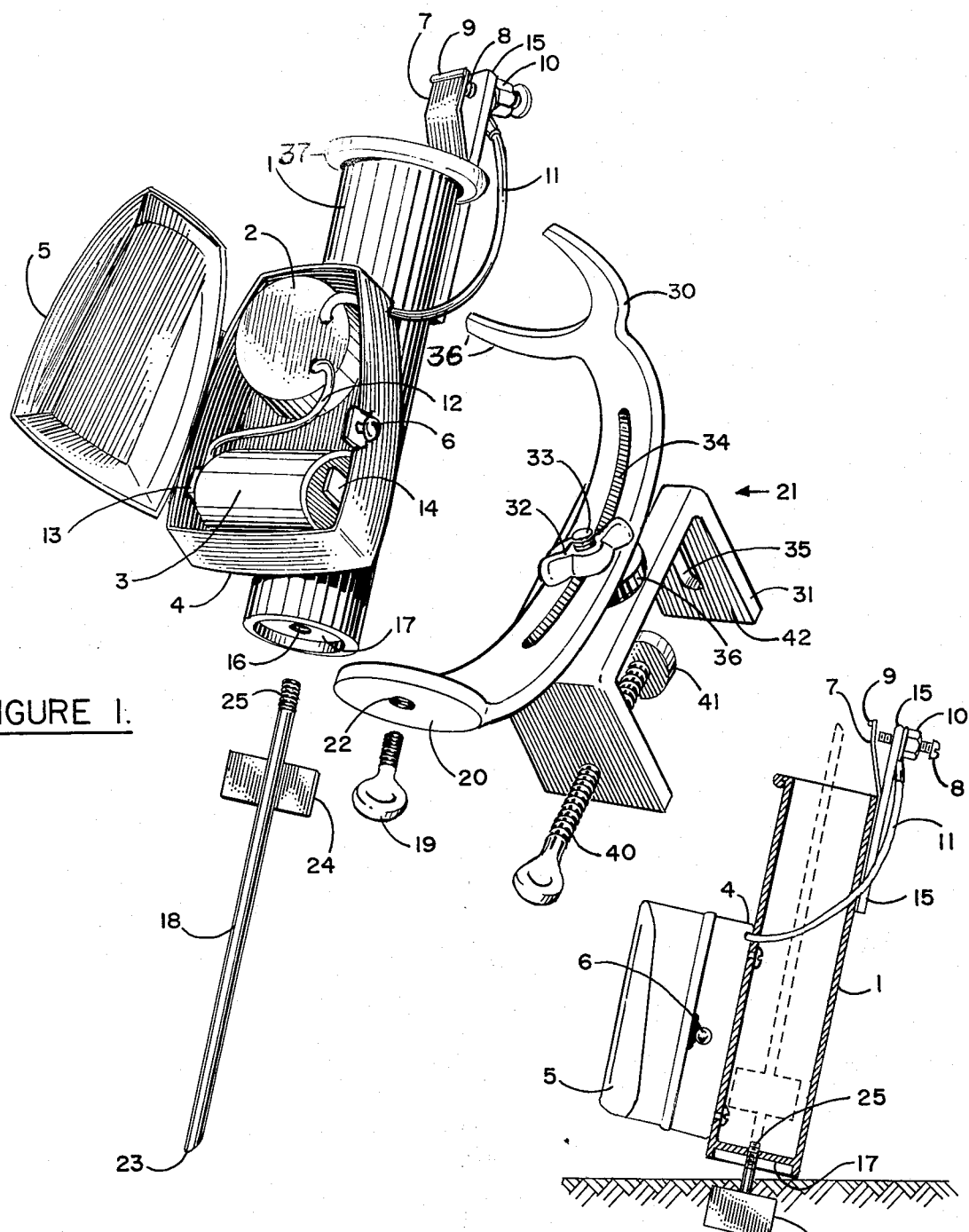

FISHING ROD HOLDER AND SIGNAL

BACKGROUND OF THE INVENTION

Several different types of fishing rod holders with alarms have been disclosed in the literature. Most of these holders have a triggering mechanism responsive to the tilt of the fishing rod caused by a fish bite. Examples of patents disclosing such systems are Leckell, U.S. Pat. No. 3,473,250, issued Oct. 21, 1969, Kricksfeld et al, U.S. Pat. No. 3,228,135, issued Jan. 11, 1966, and Gednalske, U.S. Pat. No. 3,707,801, issued Jan. 2, 1973. It is also known to provide such fishing rod holders with stakes for securing the holder to the ground, and with clamps to hold the device on a boat or pier.

However, the devices of the prior art are somewhat cumbersome, inflexible, and unduly complex. Accordingly, it is an object of the present invention to provide a fishing rod holder with a fish bite alarm which is easily portable and which can be carried in a regular-size tackle box, but which also has the flexibility of being fixed to the ground or secured to a boat or pier at an adjustable angle.

SUMMARY OF THE INVENTION

A compact, readily assemblable fishing pole holder and bite signal comprises a tubular rod holder, a removable elongated ground-piercing stake having a threaded upper end adapted to engage a threaded hole in the bottom of the tubular rod holder from the inside or outside of the rod holder, the stake having an operating position threadedly secured to the outside of the rod holder and a stored position threadedly secured inside of the rod holder. The rod holder carries signal means actuated by a spring-mounted contact responsive to movement of the fishing pole when a fish bites. In a preferred embodiment, the holder includes an easily stored mounting device capable of fixing the rod holder on a boat or pier in a variety of positions comprising two slotted opposing arcuate members, one member having means for attaching to the rod holder, and the other member having means for mounting on a boat or pier.

BRIEF DESCRIPTION OF THE DRAWINGS

FIG. 1 is an exploded perspective view of the rod holder, stake, and adjustable clamp.

FIG. 2 is a side view of the pole holder secured to the ground, with a phantom view of the stake inserted inside the tubular holder in stored position.

DETAILED DESCRIPTION OF THE INVENTION

Referring to FIG. 1, rod holder tube 1 has a bite signaling system comprising buzzer 2 and battery 3 housed in casing 4. The casing has hinged door 5 secured by push-button latch 6. The buzzer circuit is opened and closed by the action of leaf spring 7, which is urged against the end of contact screw 8 when a fish bite tilts the rod toward the spring. Cushioning strip 9, which may be a piece of rubber or a layer of flexible material such as silicone rubber caulking compound, provides a slight cushion to the rod and prevents the spring from damaging the rod. Adjustment nut 10 holds the contact screw in place, and may be used to lock the screw in various positions. For example, if the holder is mounted on a boat for trolling, the set screw would be slightly withdrawn so that the action of the boat would not continually sound the buzzer.

The buzzer is electrically connected to the battery by wire 11, which connects the contact screw to buzzer 2, and wire 12, which connects the other terminal of the buzzer to terminal 13 of battery 3. The other terminal 14 of the battery is connected to a contact point (not shown) on the back of casing 4 which abuts tube 1, which is fabricated from an electrically conductive metal such as aluminum or steel. Leaf spring 9 is also directly fastened to tube 1, making the tube part of the electrical circuit. When the spring is urged against the contact screw, the circuit, consisting of buzzer 2, battery 3, insulated wires 11 and 12, and the tube wall, is closed. Spring 9 is fastened to the tube wall by plate 15, which is made from structural electrically-insulating material such as fiber glass or plastic. Plate 15 is attached to the tube wall by screws (not shown) which also secure the base of spring 7 to the tube wall, insuring electrical contact.

The tube 1 has a threaded bore 16 in tube bottom 17 which is adapted to receive either the threaded upper portion 25 of stake 18 or thumbscrew 19, which secures the base 20 of adjustable clamp 21 to the tube. The stake has a pointed end 23 to facilitate insertion into the ground, and has a rectangular spade 24 welded to the stake near the top to prevent the stake from rotating or tilting after it has been set in the ground.

FIG. 2 shows the rod holder in place in the ground, with threaded section 25 in place in bore 16. Shown in phantom in FIG. 2 is the stake 18 in stored position inside of tube 1, with threaded section 25 of the stake engaging the threaded bore 16 from the inside of the tube. Of necessity, the width of spade 24 must be less than the inside diameter of tube 1 for such storage to occur. In stored position, the pointed end 23 of stake 18 preferably does not extend above the top of the contact assembly and leaf spring, although this is not essential to the invention. Disassembly of the stake and storage as shown in FIG. 2 allows the holder, which is less than 6 inches high and 3 ½ inches wide at the widest point, to easily be carried in a tackle box. Securing the stake inside of the tube also prevents any possible loss of the stake.

The device of the invention is also adaptable to attachment to a boat or pier. Adjustable clamp 21 comprises arcuate members 30 and 31 which are attached by wingnut 32 and bolt 33. Bolt 33 extends through lengthwise slots 34 and 35 in arcuate members 30 and 31, respectively. Slot 35 extends from the center of member 31, which is the position of bolt 33 in FIG. 1, to the opposite side of member 31 from the bore in member 31 for receiving thumbscrew clamp 40. Washer 36 separates the two slotted arcuate members and allows for a secure fit of the members in all positions along the two slots 34 and 35.

Adjustable clamp 21 is attached to the tubular rod holder by sliding the upper forked section 36' of arcuate member 30 under lip 37 at the top of tube 1, and by fitting base 20 of arcuate member 30 to the tube bottom 17. The clamp is secured to the tube with thumbscrew 19, which extends consecutively through the hole 22 in base 20 and threaded bore 16 in tube bottom 17. The clamp may then be fixed to a boat or pier by moving thumbscrew clamp 40 to secure the surface between vise grips 41 and 42, the latter corresponding to the inner surface of arcuate member 31.

After the holder is secured to the pier or boat, the appropriate direction and angle of tilt of the rod can be selected by loosening wing nut 32 and moving arcuate members 30 relative to member 31, either rotationally or along the slots in the two members.

Clamp 21 is very compactly stored in the following manner. From the position shown in FIG. 1, arcuate member 30 is rotated 180° around bolt 33. Wingnut 32 is removed from bolt 33, and arcuate member 30 is then inverted so as to open in the same direction as arcuate member 31. Bolt 33 and wingnut 32 are then replaced to hold members 31 and 30 in place. In this fashion, the forked section 36' of member 30 extends around the clamp thumbscrew 40, making a very compact storable device. In stored position, arcuate members 30 and 31 open or face in the same direction, whereas in operating position, they face oppositely.

Several variations on the specific embodiment described are possible still coming within the scope of the invention, providing a versatile, compact rod holder. For example, the tube may be made from any material, such as a structural plastic, and the spring contact may be located down inside the tube instead of above the top of the tube.

I claim:

1. A compact, readily assemblable fishing pole holder combined with a bite signal comprising:
    a tubular rod holder having an open top and a closed bottom,
    signal means carried by said tubular rod holder comprising an electrically actuated signal, a battery, and spring-mounted contact means for electrically connecting said battery and said signal situated such that a fish bite urges the fishing pole against the contact means and
    a rod holder mounting device comprising a first arcuate member having a lower end adapted to be secured to the bottom of the rod holder and an upper end adapted to engage the top portion of the rod holder, said arcuate member having a lengthwise slot therein, and a second arcuate member having a lengthwise slot therein, fastening means to adjustably secure the first and second arcuate members to each other, and clamp means for securing said second arcuate member to a fixed object.

2. The fishing pole holder of claim 1 wherein the first and second arcuate members have an operating position, opening in opposed direction, and a stored position opening in the same direction.

* * * * *